United States Patent [19]

Repella

[11] Patent Number: 4,705,277

[45] Date of Patent: Nov. 10, 1987

[54] HYDRODYNAMIC SEAL

[75] Inventor: James A. Repella, Berkley, Mich.

[73] Assignee: Microdot Inc., Darien, Conn.

[21] Appl. No.: 669,668

[22] Filed: Nov. 8, 1984

[51] Int. Cl.⁴ .......................... F16J 15/32; F16J 15/54
[52] U.S. Cl. .................................... 277/134; 277/47;
277/152; 277/DIG. 6
[58] Field of Search ..................... 277/133, 134, 96.1,
277/1, DIG. 6, 152, 47

[56] References Cited

U.S. PATENT DOCUMENTS

| | | | |
|---|---|---|---|
| 3,929,341 | 12/1975 | Clark | 277/134 |
| 4,118,856 | 10/1978 | Beinard et al. | 277/134 X |
| 4,132,421 | 1/1979 | Corsi et al. | 277/134 |
| 4,243,235 | 1/1981 | Repella | 277/DIG. 6 |
| 4,383,691 | 5/1983 | Potter | 277/134 |
| 4,416,458 | 11/1983 | Takenaka et al. | 277/96.1 |
| 4,444,399 | 4/1984 | Yanai | 277/96.1 |
| 4,447,064 | 5/1984 | Ehrmann et al. | 277/134 |

FOREIGN PATENT DOCUMENTS 970407  7/1975  Canada ............................. 277/134

*Primary Examiner*—Allan N. Shoap
*Attorney, Agent, or Firm*—Lyman R. Lyon

[57] ABSTRACT

A polytetrafluoroethylene seal is provided with surface effect vanes that effect hydrodynamic pumping of oil upon rotation of a shaft about which the seal is disposed.

3 Claims, 4 Drawing Figures

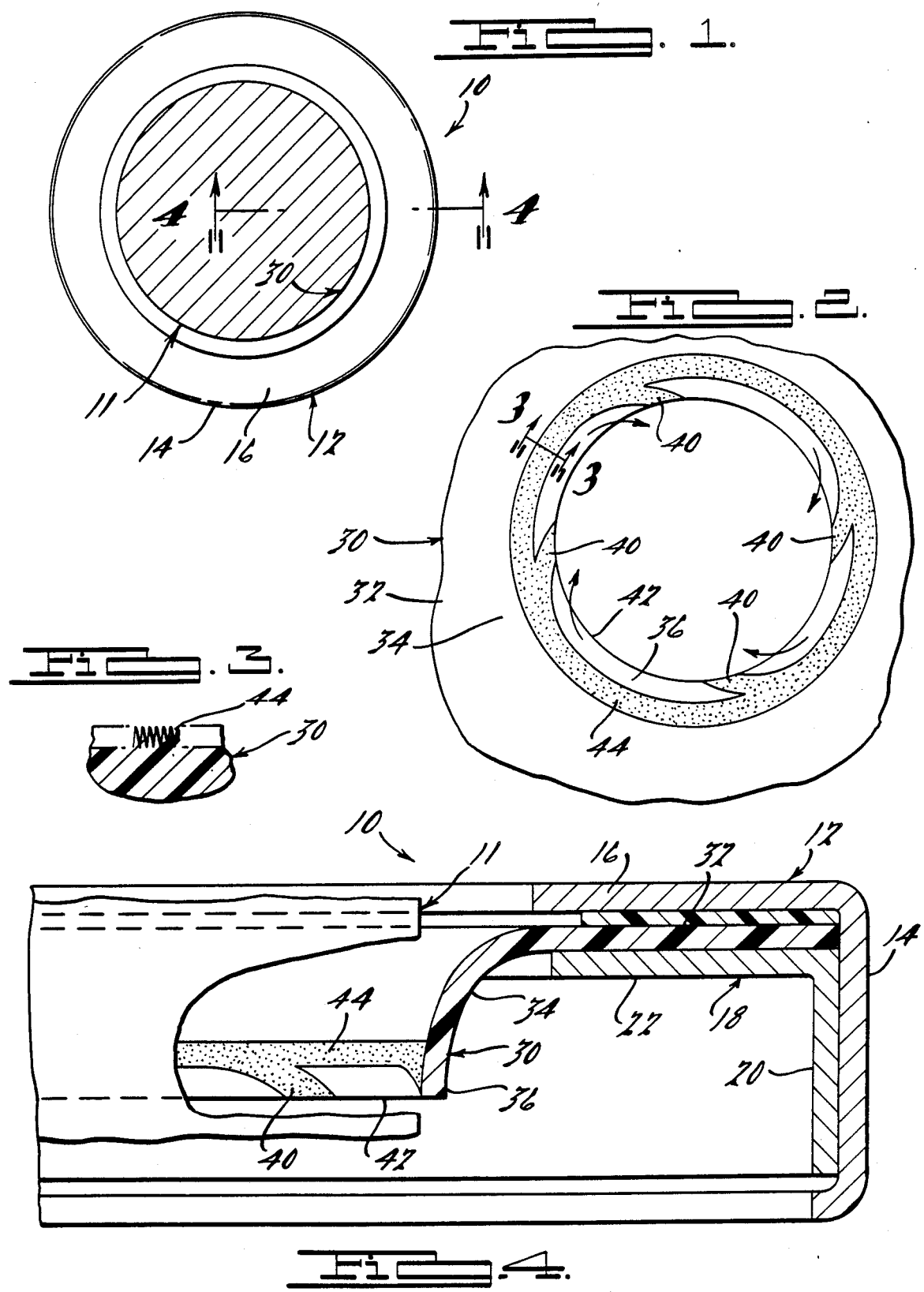

HYDRODYNAMIC SEAL

BACKGROUND OF THE INVENTION

Polytetrafluoroethylene is well known for its ability to withstand the environmental conditions to which oil seals are exposed. However, its use has been limited by its inability to be molded in an efficient manner. This problem has been solved heretofore by first grooving the end of a billet of polytetrafluoroethylene and thereafter cutting the polytetrafluoroethylene seal element from the billet as taught in, for example, applicant's copending application Ser. No. 322,640 for Bi-Directional Hydrodynamic Seal, as well as U.S. Pat. Nos. 3,857,156; 2,606,779 and 4,132,421.

Patents that teach the use of built-up ribs to effect hydrodynamic pumping of oil are U.S. Pat. Nos. 4,118,856 and 3,620,540. A teaching of both ribs and grooves is found in the "Journal of Teflon", pages 2–4, January 1970. However both open grooves and built-up ribs exhibit manufacturing and operational problems to which the present invention presents a solution.

As additional background to the present invention, it is to be noted that a fluid is a substance that deforms when subjected to shear stress, no matter how small that shear stress may be. Shear stress is the stress component tangent to a surface. The average shear stress over an area is the stress divided by the area of the surface.

When a fluid is placed between two closely spaced smooth parallel plates and a force F is applied to one plate, for example, a shaft journaled in a seal, a shear stress F/A, where A is the area of the shaft, is exerted on oil disposed between the plates, or in the example of this invention on oil between the shaft and the shaft seal. Each fluid particle moves parallel to the plates and its velocity varies uniformly from zero at the stationary plate or seal to U at the upper plate or shaft, and F is directly proportional to A and to U and inversely proportional to thickness t. In equation form $$F = \mu \frac{AU}{t}$$

in which u is a proportionality factor relating to a particular fluid. If $\tau = F/A$ for the shear stress, $$\tau = \mu \frac{U}{t}$$

The ratio U/t is the rate of angular deformation of the fluid. The angular velocity may also be written du/dy, as both U/t and du/dy express the velocity change divided by the distance over which the change occurs. The velocity gradient du/dy may also be visualized as the rate at which one layer moves relative to an adjacent layer. In differential form, $$\tau = \mu \frac{du}{dy},$$

which is known as Newton's law of viscosity, is the relation between shear stress and rate of angular deformation for one-dimensional flow of a fluid. The proportionality factor $\mu$ is called the viscosity of the fluid.

SUMMARY OF THE INVENTION

The present invention relates to a seal having a polytetrafluoroethylene seal element, the shaft engaging face of which has an improved hydrodynamic configuration in the form of an etched surface that effects a change in the velocity gradient du/dy to achieve hydrodynamic pumping action as opposed to the heretofore employed mechanical barrier systems. The etched surface effects pumping of oil back to the oil side of the seal lip.

More specifically, a series of circumferentially spaced, overlapping, etched surfaces function as "vanes". The vanes extend at an angle relative to a plane containing the seal lip that extends normal to the central axis of a shaft about which the seal is disposed. The etched vanes intersect the oil side of the seal and define pumping surfaces in the face of the seal element that function to pump oil leaking from the oil side towards the dry side of the seal back toward the oil side of the seal lip. The seal element is supported in the conventional manner by a pair of metal stampings to facilitate mounting about a shaft.

BRIEF DESCRIPTION OF THE DRAWING

In the drawing:

FIG. 1 is an end view of a shaft having a seal thereabout with a polytetrafluoroethylene seal element in accordance with the present invention;

FIG. 2 is an enlarged fragmentary view of the polytetrafluoroethylene seal element prior to assembly in a supporting metal stamping and flex of the radially inner portion thereof to a cylindrical configuration due to assembly with a shaft;

FIG. 3 is an enlarged view taken along the line 3—3 of FIG. 2; and

FIG. 4 is a view taken along the line 4—4 of FIG. 1.

DETAILED DESCRIPTION OF THE PREFERRED EMBODIMENT OF THE INVENTION

As seen in FIG. 1 a shaft seal 10 is shown operatively disposed about a shaft 11. The seal 10 comprises an outer case 12 having a cylindrical portion 14 and a radial flange 16. As seen in FIG. 4, an inner case 18 has a cylindrical portion 20 and a radial flange 22 and is nested in the outer case 12. A seal element 30, made from polytetrafluoroethylene, has a flat radially outer portion 32, an intermediate flex portion 34, and a generally cylindrical radially inner portion 36.

In accordance with the present invention, the shaft engaging radially inner portion 36 of the polytetrafluoroethylene seal element 30 is provided with a plurality of etched or otherwise roughened surfaces or vanes 40 that intersect a radially inner edge 42 of the element 30 at the oil side thereof. The etched surfaces or "surface effect" vanes alter the initial slope of the velocity gradient du/dy discussed above or, in other words, alter the rate of angular deformation of the oil between "surface effect" portions of the seal 10 and shaft 11. At the point of maximum spacing from the edge 42, the vanes 40 intersect one another to define a continuous etched circle 44. As seen in FIG. 4, the vanes 40 extend at an angle of approximately 45° to a radial plane extending normal to the central axis of the seal element 30. The vanes 40 collect oil carried circumferentially upon rotation of the shaft 11 due to a pressure differential across the vanes created by a differential in the angular velocity (du/dy) of oil on the vane surfaces and the angular velocity (du/dy) of oil between the vanes.

In accordance with a constructed embodiment of the invention, the preferred technique for altering the surface of the vanes 40 is by an etching process comprising masking the surface of the seal element 30 with wax, grease or paint so as to expose a desired configuration for the vanes 40 and thereafter applying a solution of metallic sodium in liquid anhydrous ammonia to the exposed seal surface for a period of 60 to 120 seconds. The etching solution must be maintained at a temperature below the boiling point of liquid ammonia or approximately −37° F. The etching solution is applied to the unmasked portion of the seal element 30 while the seal element 30 is in the flat condition as seen in FIG. 2.

Other techniques that can be utilized to abraid or otherwise alter the surface of the seal element in a desired vane configuration so as to alter the du/dy of oil moving thereover are abrasive blasting, laser etching, heat branding, etc. The common feature of the aforesaid surface treatments is that the seal surface is treated to alter the velocity gradient (du/dy) of oil flow thereacross as opposed to the creation of mechanical barriers as taught in the prior art.

While the preferred embodiment of the invention has been disclosed, it should be appreciated that the invention is susceptible of modification without departing from the scope of the following claims.

I claim:

1. A hydrodynamic oil seal comprising
    a thin generally cylindrical polytetrafluoroethylene seal element adapted to journal a rotatable shaft and the cylindrical surface of the element facing the shaft having one end portion extending toward an oil side of said seal and an opposite end portion extending toward a dry side of said seal,
    the seal element having discontinuous relatively smooth portions at the one end portion thereof orientated in an annular array so as to lie in a radial plane extending at a right angle to the axis of rotation of said shaft and engageable with said rotatable shaft,
    said seal element having an annular roughened portion between said annular smooth portions thereof and the opposite end portion of said seal element lying in a plane parallel to the plane of said smooth portions and engageable with said shaft, said roughened portion being defined by randomly orientated peaks and valleys, and
    a plurality of hydrodynamic pumping vanes having a roughened surface similar to the annular roughened portion of said element and contiguous therewith and extending therefrom between and defining the annular smooth portions of said seal element at an acute angle relative to the plane containing said roughened annular portion and in the direction of
    rotation of the shaft journaled by said seal element thereby to effect hydrodynamic pumping of oil to the oil side of said seal.

2. A seal in accordance with claim 1, wherein said roughened surface comprises an etched surface.

3. A seal in accordance with claim 2 wherein said etched surface is achieved by the application of a solution of metallic sodium in liquid anhydrous ammonia to the surface of said seal element in a pattern that defines said roughened surface and said hydrodynamic vanes.

* * * * *